United States Patent [19]

Neyret

[11] Patent Number: 4,756,638

[45] Date of Patent: Jul. 12, 1988

[54] LOCK MOUNTING

[75] Inventor: Guy Neyret, Francheville, France

[73] Assignee: Neiman, Courbevoie, France

[21] Appl. No.: 920,737

[22] Filed: Oct. 17, 1986

[30] Foreign Application Priority Data

Oct. 30, 1985 [FR] France .................................. 85 16098

[51] Int. Cl.⁴ ............................................... F16B 9/00
[52] U.S. Cl. .................................... 403/261; 403/349; 70/451
[58] Field of Search ................ 403/261, 349, 194, 201; 248/27.1; 70/451; 285/161, 360, 361, 376, 396, 401, 402

[56] References Cited

U.S. PATENT DOCUMENTS

| | | | |
|---|---|---|---|
| 2,689,700 | 9/1954 | Drury | 248/27.1 |
| 2,833,158 | 5/1958 | Damon | 403/349 X |

FOREIGN PATENT DOCUMENTS

| | | | |
|---|---|---|---|
| 2527404 | 1/1976 | Fed. Rep. of Germany | 403/349 |
| 1568210 | 5/1980 | United Kingdom | 403/349 |

Primary Examiner—Andrew V. Kundrat
Attorney, Agent, or Firm—James Creighton Wray

[57] ABSTRACT

A combination lock mounting and panel assembly, said panel having a circular orifice extended by a plurality substantially rectangular cut-away portions disposed crosswise, comprises (a) an external ring to be pressed upon the external face of the wall having a cylindrical wall passing through the said circular orifice, (b) radial lugs fast with the said ring and lodged in the said cut-away portions, (c) further radial lugs carried by the extremity of the said cylindrical wall, said further lugs being offset axially in relation to the first lugs, (d) a stop-forming axial wall for connecting at least one of said further lugs to at least one of the first lugs, (e) peripheral dogs at the extremity of the body at its extremity adjacent the wall, said pheripheral dogs serving to lodge each between a first and a second lug of the ring in the course of a translation movement followed by a rotation of the said body on the ring, certain at least of the lugs being in pawl-engagement-type co-operation with at least certain of the dogs of the bolt body, and (f), a compressible gasket interposed between the extremity of the body adjacent the wall and the said cylindrical wall.

5 Claims, 2 Drawing Sheets

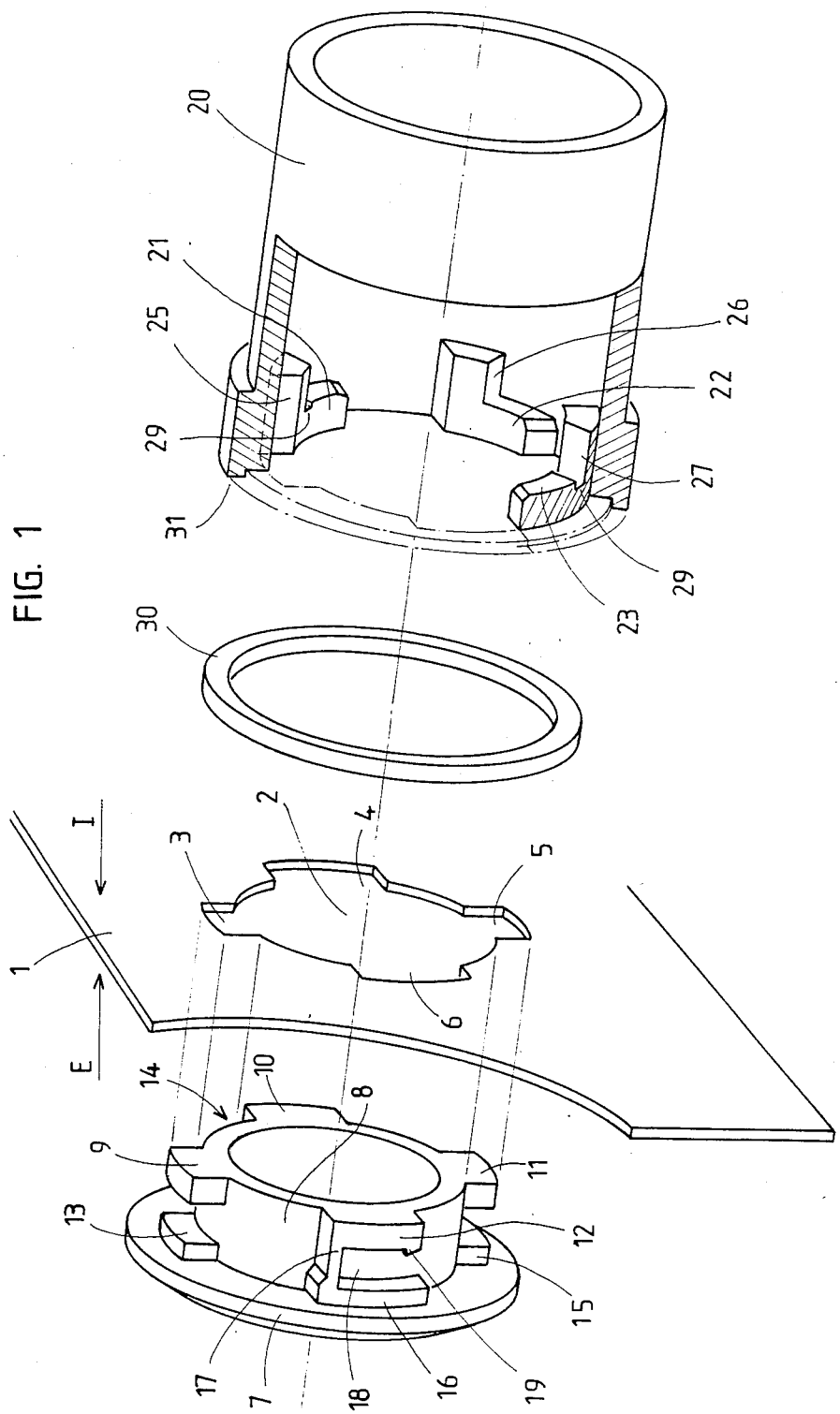

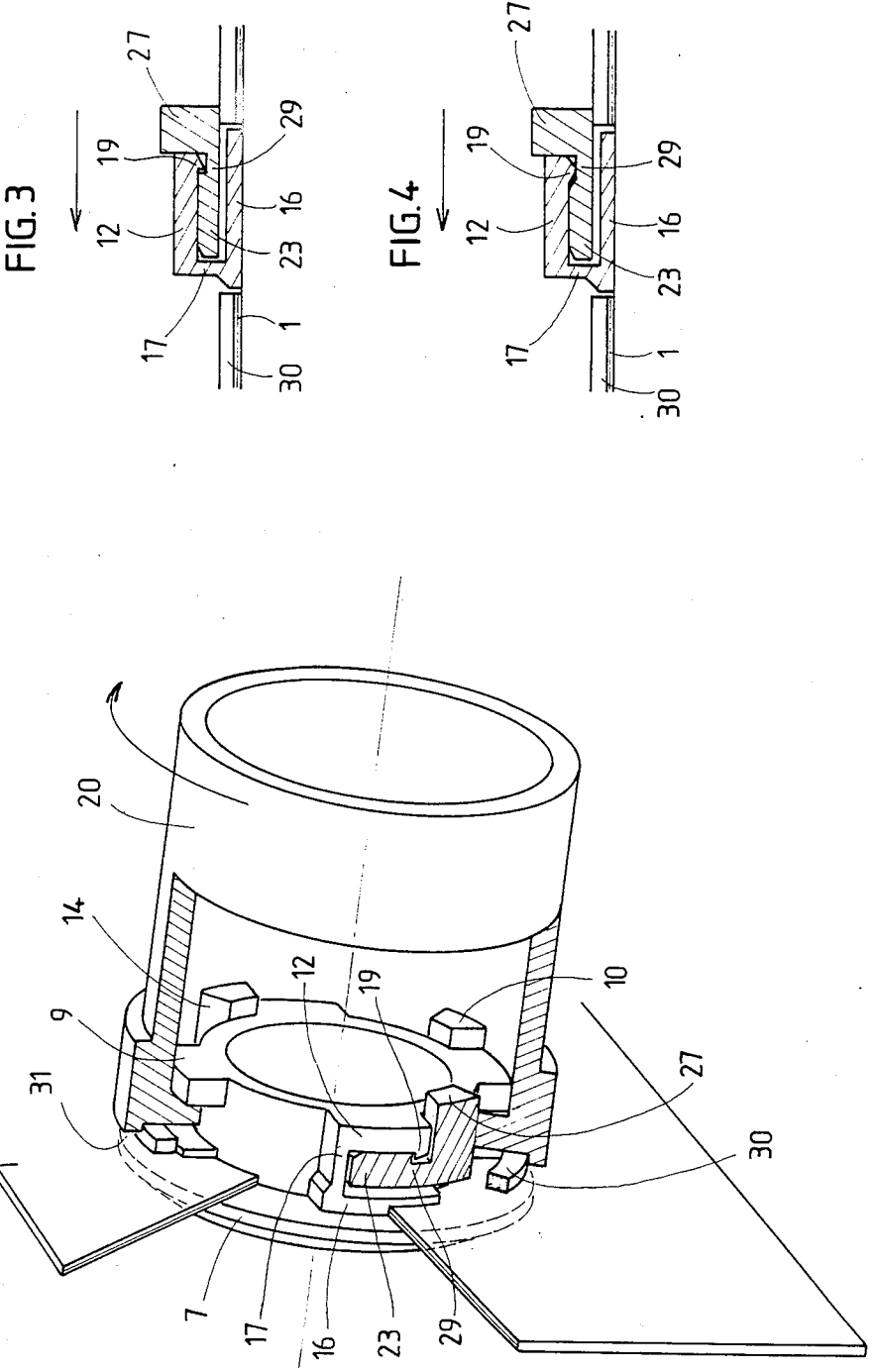

LOCK MOUNTING

BACKGROUND TO THE INVENTION

The invention relates to a bolt or lock mounting for fitting on both sides of a panel or wall comprising a circular orifice extended by a plurality of substantially rectangular cut-away portions disposed crosswise.

The strength of bolts mounted on relatively thin walls, as is the case for example with automobile doors, is directly connected to the fixing method utilised.

It is usual for a circular opening extended by cut-away portions disposed crosswise to be formed in the wall and for a corresponding form to be imparted to the external part of the bolt mounting which passes through the wall, the mounting being retained by a fork piece on the face of the wall which is not accessible. The co-operation of the profiled part of the mounting with the cut-away of like form of the wall prevents rotation of the fixed part of the bolt mounting.

However in the case of an attempt at violent twisting, the resistance offered by the wall is often insufficient by reason of the fact that it works directly to buckling in the weakened zone of the opening. Likewise the resistance to driving-in is often insufficient.

OBJECT OF THE INVENTION

An object of the present invention is to reduce the drawbacks of known bolt mountings by reason of a new bolt mounting which further permits very simple fitting and removal.

SUMMARY OF THE INVENTION

To this end the mounting according to the invention is characterised in that it comprises an external ring pressing upon the external face of the wall and prolonged towards the interior by a cylindrical wall passing through the said circular orifice, the said cylindrical wall comprising radial lugs fast with the said ring and lodged in the said cut-away portions, the extremity of the said cylindrical wall carrying radial lugs offset axially in relation to the first lugs and connected, as regards at least one of them, to the first lugs by a stop-forming axial wall, the bolt body comprising, at its extremity adjacent to the wall, peripheral dogs which come to lodge each between a first and a second lug of the ring in the course of a translational movement followed by a rotation of the said body on the ring, at least certain of the lugs being in pawl-type co-operation with at least certain of the dogs of the bolt body, while a compressible gasket is interposed between the face of the bolt body adjacent to the wall and the said wall.

The fitting of the mounting according to the invention is effected in a very simple manner, after positioning of the ring, by positioning of the mounting body and rotation of the dogs between the lugs of the ring until they engage and abut against the axial walls joining the lugs.

In one form of embodiment of the invention the means for pawl-type engagement of the dogs on the lugs are reversible, which facilitates dismantlement by the reverse operation. In one variant of embodiment the pawl-engagement means are uni-directional and dismantlement is effected by pushing the body towards the wall, compressing the gasket, and reverse rotation.

The resistance to forcible rotation, driving-in and alternating flexion is greatly increased by the fact that the wall around the orifice is compressed between the ring and the adjacent face of the body over its entire perimeter, instead of being so compressed at two points, as in the case of the usual fixing by a fork piece.

The resistance to forcible rotation and driving-in is greatly increased by the fact that the wall around the orifice is compressed between the ring and the adjacent face of the body.

BRIEF DESCRIPTION OF DRAWINGS

The invention will be understood on reading of the following description given with reference to the attached drawing, wherein:

FIG. 1 is a diagrammatic exploded perspective view of a bolt mounting according to one example of embodiment of the invention, before fitting on a panel;

FIG. 2 is a diagrammatic perspective view, partially in section, of the mounting according to FIG. 1, fitted on the wall;

FIG. 3 is a diagrammatic sectional view of a pawl-type engagement system according to one form of embodiment; and FIG. 4 is analogous with FIG. 3, for a variant.

DESCRIPTION OF PREFERRED EMBODIMENT

The wall 1 on which the bolt is to be mounted in the usual way comprises a circular orifice 2 extended by four rectangular cut-away portions 3, 4, 5, 6 disposed crosswise. The bolt comprises an external ring 7 pressing upon the external face E of the wall 1 and prolonged towards the interior by a cylindrical shank 8 passing through the orifice 2. In known manner the ring 7 comprises a key slot mask which may be provided with a sealing flap (not shown).

The free extremity of the shank 8 carries four radial lugs 9, 10, 11, 12 passing respectively through the cut-away portions 3, 4, 5, 6. In the zone of junction between the internal face of the ring 7 and the shank 8 there are formed four lugs 13, 14, 15, 16 substantially identical with the lugs 9, 10, 11, 12 and disposed axially in relation to these. The lugs 12 and 16 and the lugs 10 and 14 are connected by an axial wall 17 forming an open circumferential lodgement 18. The lugs 12 and 10 comprise a radial tooth 19 at the entry to the opening of the lodgement 18.

The bolt body 20 forms an external socket of which the extremity turned towards the wall 1 is equipped with four internal circumferential dogs 21, 22, 23 (the fourth being removed for illustration purposes). The dogs are prolonged by axial stops 25, 26, 27, a groove 29 being formed between the dogs 21, 23 and the stops 25, 27 respectively. A compressible gasket 30 is interposed between the internal face I of the wall 1 and the adjacent extremity 31 of the bolt body 20.

Fitting is effected by a conventional bayonet system, the dogs 21, 22, 23 sliding between the lugs 9 - 13, 10 - 14, 11 - 15, and 12 - 16 respectively. At the end of the rotation of the body 20 the teeth 19 come to engage in the grooves 29 to immobilise the body 20.

In the form of embodiment according to FIG. 3, the groove 29 is straight-edged and dismantlement necessitates pre-compression of the gasket 30. In the variant according to FIG. 4, the edge of the groove 29 is bevelled, so that engagement is reversible.

I claim:

1. A combination lock mounting and panel assembly, said panel having a circular orifice extended by a plurality substantially rectangular cut-away portions disposed crosswise, comprising
  (a) an external ring to be pressed upon the external face of the wall having a cylindrical wall passing through the said circular orifice,
  (b) radial lugs fast with the said ring and lodged in the said cut-away portions,
  (c) further radial lugs carried by the extremity of the said cylindrical wall, said further lugs being offset axially in relation to the first lugs,
  (d) a stop-forming axial wall for connecting at least one of said further lugs to at least one of the first lugs,
  (e) a bolt body receiving the cylindrical wall of said external ring
  (f) peripheral dogs at the extremity of the body at its extremity adjacent the wall, said peripheral dogs serving to lodge each between a first and a second lug of the ring in the course of a translation movement followed by a rotation of the said body on the ring, at least one of the lugs effecting pawl-engagement with at least one of the corresponding dogs of the bolt body, and
  (g) a compressible gasket interposed between the extremity of the body adjacent the wall and the said cylindrical wall.

2. A combination lock according to claim 1, wherein the pawl engagement of the at least one of the dogs on the lugs is reversible.

3. A combination lock according to claim 1 wherein the pawl engagement of the at least one of the dogs on the lugs is unidirectional.

4. A combination lock according to claim 2 wherein reversible pawl engagement is effected by means of teeth provided on the lugs, said teeth being adapted to permit reverse relative rotation of the external ring and the bolt body.

5. A combination lock according to claim 3 wherein the pawl engagement is effected by means of teeth provided on the lugs, said teeth providing means for preventing reverse relative rotation of the external ring and the bolt body.

* * * * *